US006526325B1

(12) United States Patent
Sussman et al.

(10) Patent No.: US 6,526,325 B1
(45) Date of Patent: Feb. 25, 2003

(54) PITCH-PRESERVED DIGITAL AUDIO PLAYBACK SYNCHRONIZED TO ASYNCHRONOUS CLOCK

(75) Inventors: Robert Sussman, Capitola, CA (US); Jean Laroche, Santa Cruz, CA (US); Mark Dolson, Ben Lomond, CA (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/418,860

(22) Filed: Oct. 15, 1999

(51) Int. Cl.[7] .................................... G06F 17/00
(52) U.S. Cl. .................................... 700/94; 704/503
(58) Field of Search .................... 700/94; 704/503, 704/500, 504, 501, 258, 502, 201–206, 278; 381/54

(56) References Cited

U.S. PATENT DOCUMENTS

| | | | | | |
|---|---|---|---|---|---|
| 3,982,070 | A | * | 9/1976 | Flanagan | 179/1 |
| 3,995,116 | A | * | 11/1976 | Flanagan | 179/1 |
| 5,504,833 | A | * | 4/1996 | George et al. | 395/2.2 |
| 5,641,927 | A | * | 6/1997 | Pawate et al. | 84/609 |
| 5,886,276 | A | * | 3/1999 | Levine et al. | 84/603 |
| 6,266,644 | B1 | * | 7/2001 | Levine | 704/503 |
| 6,323,797 | B1 | * | 11/2001 | Kikumoto et al. | 341/144 |

* cited by examiner

*Primary Examiner*—Curtis Kuntz
*Assistant Examiner*—Lun-See Lao
(74) *Attorney, Agent, or Firm*—Townsend and Townsend and Crew LLP

(57) ABSTRACT

A method and apparatus for synchronizing audio to an asynchronous clock while preserving pitch utilizes a phase-vocoder to implement time-scaling without pitch-shifting.

4 Claims, 2 Drawing Sheets

PITCH-PRESERVED DIGITAL AUDIO PLAYBACK SYNCHRONIZED TO ASYNCHRONOUS CLOCK

BACKGROUND OF THE INVENTION

This invention relates to systems and methods for playing multimedia content and more particularly to systems and methods for synchronizing digital audio playback to a variable rate asynchronous clock.

Systems have been in use for synchronizing multimedia playback of independent devices for some time now. Typically a clock source is distributed from a master clock to all slave devices. The slave devices extract playback position and rate information from the master clock to synchronize playback with the master. Common clock formats are Society of Motion Picture and Television Engineers (SMPTE) Time-Code, and Musical Instrument Digital Interface (MIDI) Time-Code (MTC). These clock formats specify a method of periodically transmitting the current playback location to a slave device.

For example, in video production environments it is common to synchronize the playback of a digital audio recorder with the playback of video from an independent video recording device. The video recording device could send its master clock signal to the audio recorder. In another application, a hard disk recorder may be synchronized to an external Musical Instrument Digital Interface (MIDI) sequencer or an analog playback device, such as a reel-to-reel multitrack audio recorder.

In the above applications the clock is typically fairly stable. For some other applications the clock rate and direction may fluctuate quite dramatically. For example, an audio scrubbing system can be implemented in which the playback of an audio track is synchronized with a user's movement of an input device across a representation of the audio waveform or time-varying spectrum. The user can move the input device forward and backward over a portion of the graphical representation. The movement of the input device is translated into a clock specifying the playback position (media time) and playback rate.

When the slave device is playing back digital audio, the input clock is asynchronous to the sample clock on the audio system's digital to analog converter (DAC) and can speed up, slow down, change directions, or even stop at any given time. When the clock speeds up the playback of the audio needs to speed up to maintain synchronization. Likewise, when the clock slows down the playback of the audio needs to slow down. Conventional systems do this using sample rate conversion which results in pitch shifting of the audio content thus reducing the intelligibility, fidelity, and enjoyment of the playback. If a clock is not very stable it may periodically speed up and slow down thus causing the audio system to speed up and slow down thus introducing pitch artifacts into the audio signal.

FIG. 1 illustrates a conventional system 100. System 100 is a digital audio playback system that can be synchronized to an external clock. It includes a digital audio data storage 110, a clock extraction component 112, a sample-rate converter 114, and an audio output unit 116 that contains the Digital to Analog Converter (DAC) 118 and the DAC sample clock 120.

To maintain synchronization between the input clock and the output audio a "locate and chase" technique is performed. Initially the clock extraction component extracts the current playback location and playback rate from the input clock. Then audio playback is started at the current located position, the audio is sample-rate converted to speed up or slow down playback relative to the audio system's sample clock, and the audio is output though the audio system's DAC. Then the clock extraction component continuously updates the current playback rate and uses the rate to adjust the amount of sample-rate conversion done. In detail the steps are as follows:

1. Extract the current playback position and playback rate from the input master clock. Send the current position to the Digital Audio Data Storage block and send the current rate to the Sample-Rate Converter.
2. A block of one or more Audio samples corresponding to the current playback position is sent from the Digital Audio Data Storage to the Sample-Rate Converter.
3. The Sample-Rate Converter changes the sample rate of the audio stream sent through it thus generating more samples to slow down playback or generating fewer samples to speed up playback. The rate is chosen appropriately based on the DAC output sample rate and the current rate that is extracted from the input clock.
4. The audio samples are output through the audio system's DAC, now at the proper rate and location to be synchronized with the input clock signal.
5. This process is repeated as long as playback is desired.

What is needed is a system and methodology for providing pitch preserved audio playback which can be synchronized to a variable rate external clock signal.

SUMMARY OF THE INVENTION

According to one aspect of the invention, a system and methodology provides pitch preserved audio playback synchronized to a variable rate external clock signal. Pitch is preserved by using the phase vocoder to synthesize output audio blocks.

According to another aspect of the invention, synchronization is maintained by driving the analysis time of the phase vocoder with the current media playback time derived from the master clock.

According to a further aspect of the invention, the standard phase vocoder procedure is followed, using the analysis time from the previous phase vocoder iteration and the current analysis time to derive the input hop size.

Additional features and advantages of the invention will be apparent from the following detailed description and appended drawings.

DESCRIPTION OF THE SPECIFIC EMBODIMENTS

Figure 1:
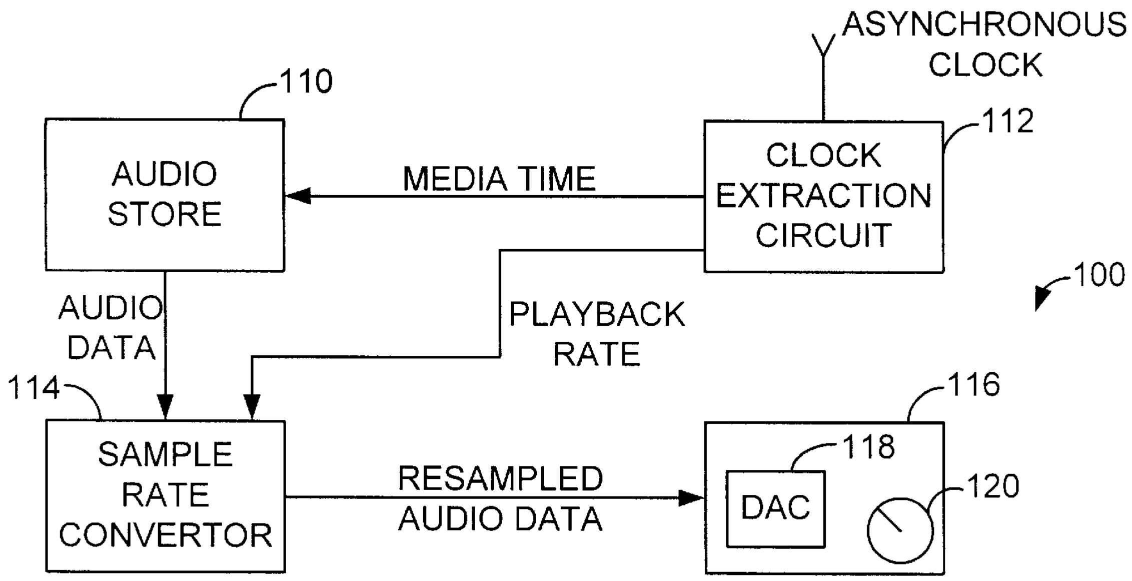
FIG. 1 PRIOR ART
FIG. 1 is a block diagram of a prior art system.
Figure 2:
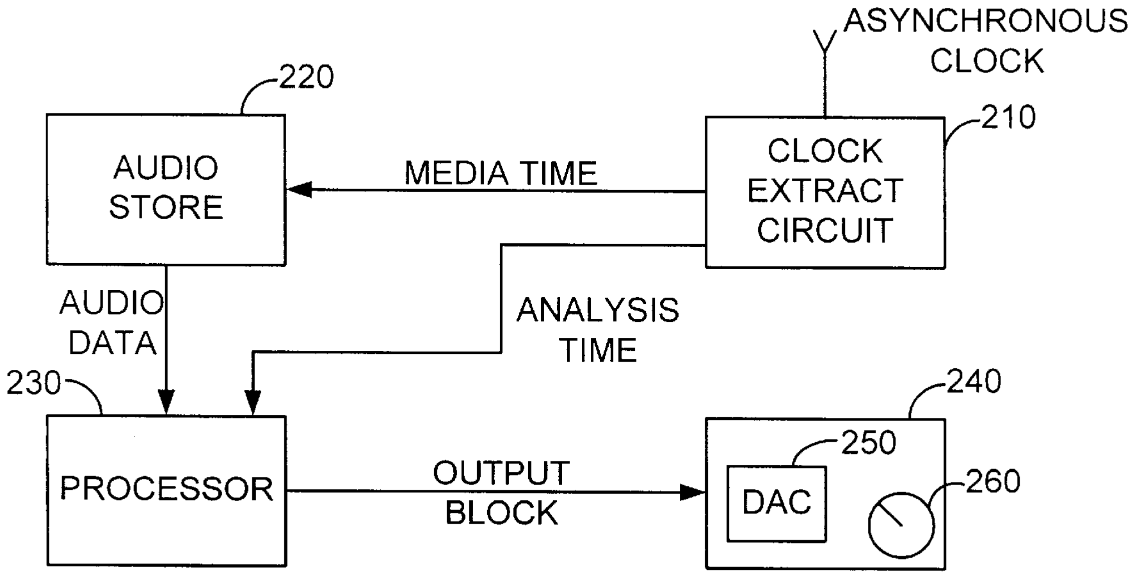
FIG. 2 is a block diagram of a preferred embodiment of the invention.

The preferred embodiments of the invention will now be described. FIG. 2 is a block diagram of a currently preferred embodiment. In FIG. 2 an audio system 200 includes a clock extraction circuit 210 which receives an asynchronous clock signal, a audio store 220 for storing an audio signal in digital format, a processor 230, and an audio output unit 240 that contains the Digital to Analog Converter (DAC) 250 and the DAC sample clock 260. In a preferred embodiment the processor 230 is a digital signal processor (DSP).

The external clock is asynchronous to and runs independently of the DAC sample clock 260. This external clock contains information related to the media time and playback rate specified by an external system. As described above, the external system may be audio scrubbing system which provides media positions selected arbitrarily by a user. Alternative sources of the asynchronous clock are also possible, for example, a user might scan a video display at arbitrary speeds and the video system would provide a clock output specifying the media position corresponding to frames being displayed and the varying playback rate. In the following the term "media time" is a generic term for an index into the playback media and "analysis time" is a pointer to a particular location in the audio input signal that is input to the FFT for analysis.

The present invention utilizes a phase vocoder to explicitly synchronize the audio output to the variable-rate, asynchronous clock signal. The phase vocoder is a well-known tool for high fidelity time scale modification of digital audio and is described in a paper by Dolson entitled "The Phase Vocoder: A Tutorial" *Computer Music J.,* vol. 10, no. 4, pp. 14–27, 1986. In the phase vocoder a succession of Fourier transforms of an audio signal are taken over finite-duration windows, or frames, in time. The distance between the centers of windows is the input hop time. The audio signal is resynthesized by adding together successive inverse Fourier transforms, overlapping them in time to correspond with the overlapping of the input Fourier transforms. The spacing between the output inverse Fourier transforms is the output hop size.

To implement pitch-preserving time scaling the input FFTs are spaced either further apart (time compression) or closer together (time expansion) than the resynthesis inverse FFTs.

Time-scale modification with the phase-vocoder involves a Short-Term Fourier Transform (STFT) in which the hop size (the time-interval between successive frames) is not the same at the input and at the output. For example, to stretch a signal by 30%, the input hop size would be 30% smaller than the output hop size. The output hop size is usually kept constant, while the input hop size can vary to accommodate the desired local time-scaling factor. The phase of the synthesis inverse FFTs must be adjusted according to the change in hop size between the input and output of the phase vocoder. In a preferred embodiment, the FFTs and inverse FFTs are implemented in the DSP.

Negative input hop may be utilized to respond to an asynchronous clock running backwards as long as the corresponding negative values are used in the phase-modification stage. Null input hop sizes, used for freezing time when the asynchronous clock is frozen, are more problematic for most time-scaling techniques. The problem arises from the fact that most of the phase-vocoder time-scaling techniques rely on the calculation of the instantaneous frequencies dominating each FFT channel, which is done by taking the first-order difference of the phase between two consecutive frames and dividing by the input hop size. If the hop-size is null, then this yields 0=0, which is enough information to calculate the instantaneous frequency. The technique described in an article by M. S. Puckette, entitled "Phase-locked vocoder", *Proc. IEEE ASSP Workshop an appp. of sig. proc. to audio and acosu.,* New Paltz, N.Y., 1995, is immune to that problem since the instantaneous frequency (rather, the output phase increment) is calculated by use of an additional FFT carried out on a later portion which is accurate to retaining high fidelity audio, the original pitch, and synchronization with the video. All the other techniques need a minor modification to be able to freeze time on any particular frame. Several solutions are described below:

One solution consists of avoiding the calculation of the instantaneous frequencies altogether, and using those estimated at the preceding frame. This is the simplest, most cost-effective solution, but it requires saving the instantaneous frequencies at each frame, which is not always convenient from an algorithmic point of view (because in many phase-modification techniques, the instantaneous frequency is not explicitly calculated).

Another solution consists of artificially forcing the input hop size to be non-zero, for example by oscillating between input hops of 1 and −1 samples at consecutive frames. This technique yields good results, and does not require any significant modification of the algorithm.

Figure 3:
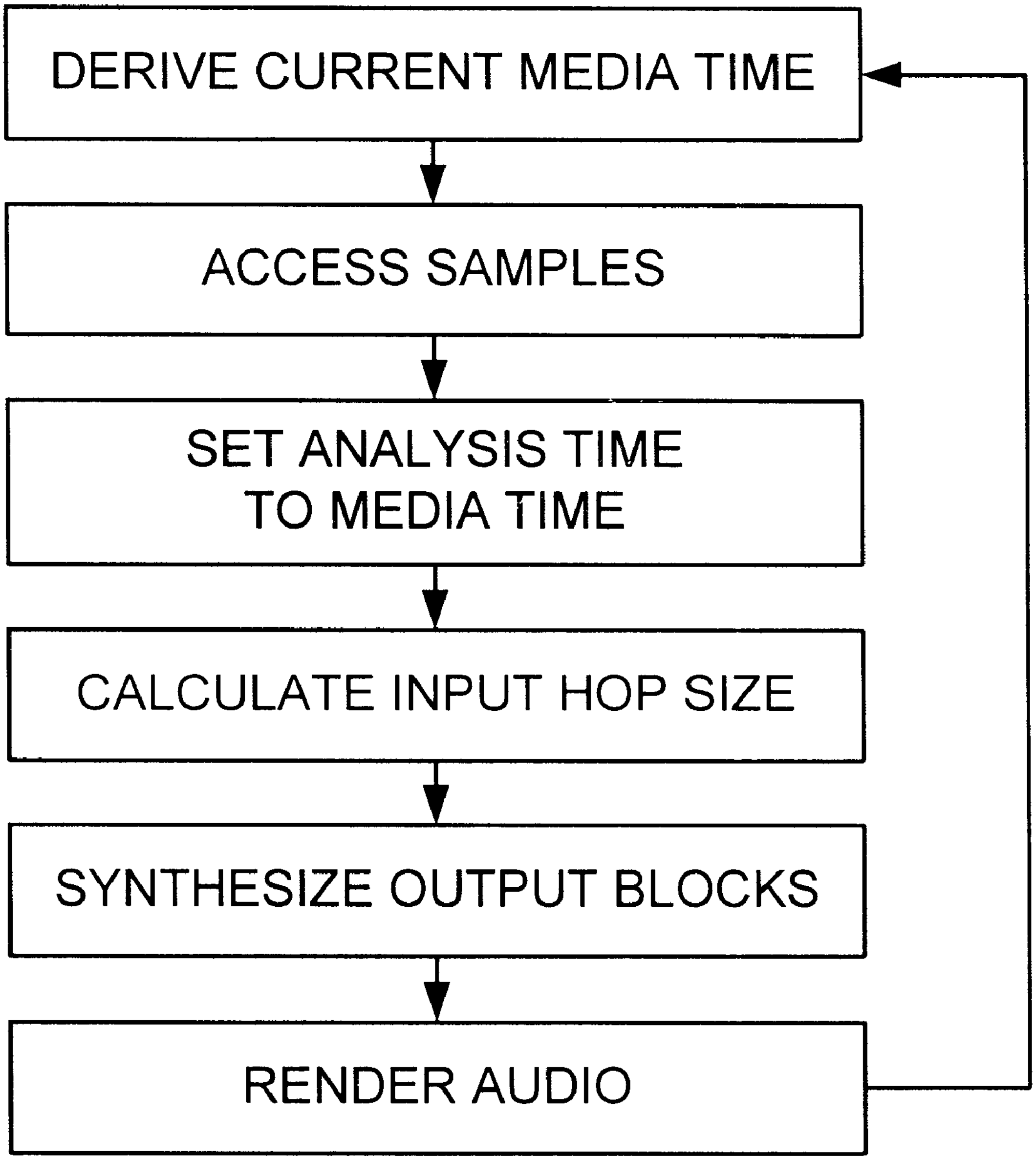
FIG. 3 is flow chart of steps for performing a preferred embodiment of the invention.

FIG. 3 is a block diagram of the steps implemented by the system to synchronize audio playback to the external asynchronous clock.

1. Derive current media time from the asynchronous clock.
2. Get a block of samples at the current media time from the Digital Audio Data Storage.
3. Set the phase vocoder analysis time to the current media time derived in step 1.
4. Then derive the input hop size from the difference of the previous phase vocoder analysis time and the current phase vocoder analysis time.
5. Use phase vocoder to synthesize an output block of samples consisting of output hop size samples. Standard phase vocoder time scaling sets the input hop size according to a desired time modification factor.
6. Send synthesized audio samples to the system's audio output to be clocked out the DAC.
7. Go back to step 1 and repeat.

Steps 1 and 2 cause the audio output of a given frame to correspond to the current time obtained from the asynchronous input clock. Information from the asynchronous clock is translated to obtain the current analysis time, ta, for each iteration of the phase vocoder. The input clock is running asynchronously from the DAC clock and the time between updates on it may large compared to the time between iterations of the phase vocoder (the output hop size). Therefore, interpolation of the input clock position for each phase vocoder iteration may be necessary.

In step 5, once the appropriate analysis time, $t_a(n)$, in seconds, for an iteration of the phase vocoder is determined, the input hop size, in units of samples, is computed according to: $H_i=(t_a(n)-t_a(n-1))/F_s$ where $F_s$ is the sampling rate in Hz. The input hop size is required to adjust the phases of the output of the phase vocoder.

In step 6, the audio is output through the system's DAC for rendering. Note that the output DAC may buffer a significant amount of audio data, thus causing an output latency of $t_1$ seconds. This latency can be compensated for by appropriately modifying the analysis time. For example, if the $t_1$ were 50 ms, the current analysis time and rate would be interpolated to where the input clock will be in 50 ms, and that analysis time would be used.

Note that each iteration of the above seven steps produces a number of samples equal to the output hop size used in the phase vocoder. The samples are then played out at a constant output sample rate. The above five steps are repeated often enough so that a constant stream of samples is provided to play out the DAC. For example, if the FFT size of the phase vocoder is 4096 samples and the output overlap is 50% then the output hop size will be 2048 samples. If the output sample rate is 44100 Hz then the above seven steps will run approximately every 2048 samples/44100 samples/sec=46.4 ms.

In FIG. 2, the various blocks can be implemented in hardware. However, as is well-known in the art all the steps performed by the blocks can be implemented in software executed by a high-speed computer.

The invention has now been described with reference to the preferred embodiments. Alternatives and substitutions will now be apparent to persons of skill in the art. Accordingly, it is not intended to limit the invention except as provided by the appended claims.

What is claimed is:

1. A method for synchronizing an audio stream to an asynchronous clock, said method comprising the steps of:

extracting a current analysis time from the variable rate asynchronous clock;

accessing a current input block of the audio output stream corresponding to the current analysis time;

setting a phase vocoder input hop size equal to the difference between the current analysis tine and an immediately previous analysis;

performing an FFT on the current block of the audio input stream to generate a set of frequency bins;

performing an inverse FFT on said frequency bins to generate a current output block of the audio output stream;

overlapping the current output block with a previous output block separated by a fixed output hop size.

2. A method for synchronizing an audio stream to an asynchronous clock, said method comprising the steps of:

extracting a current analysis time from the variable rate asynchronous clock;

accessing a current input block of the audio output stream corresponding to the current analysis time;

setting a phase vocoder input hop size equal to the difference between a current analysis time and an immediately previous analysis time divided by the sampling rate;

utilizing a phase vocoder to synthesize a current output block of said audio output stream, with the analysis time of the phase vocoder set to the current analysis time;

overlapping the current output block with a previous output block separated by a fixed output hop size.

3. A system for synchronizing an audio stream to an asynchronous clock, said system comprising:

clock extraction circuit which receives an asynchronous clock signal and generates a current analysis time specifying a portion of the audio stream synchronized to the asynchronous clock, an audio store, coupled to said clock extraction circuit, for storing an audio signals in digital format and for providing a current portion of the audio signal specified by the current analysis time, a processor, coupled to said audio store to receive said current portion, with said processor for:

performing an FFT on the current block of the audio input stream to generate a set of frequency bins;

performing an inverse FFT on said frequency bins to generate a current output block of the audio output stream;

setting an input phase vocoder input hop size equal the difference between the current analysis time and an immediately previous analysis time divided by the sampling rate;

adjusting the phase of current output block relative to a previous output block based on input hop size;

overlapping the current output block with a previous output block separated by a fixed output hop size; and an audio output unit that contains a Digital to Analog Converter (DAC) and a DAC sample clock for providing a constant DAC clock rate, with the audio output unit coupled to said processor to receive said current output block and rendering the current output block at the DAC clock rate.

4. A computer program product comprising:

a computer readable storage structure embodying computer readable program code for causing a computer to implement synchronizing an audio stream to an asynchronous clock when executed by a computer, with said program code comprising:

program code for causing the computer to extract a current analysis time from the variable rate asynchronous clock;

program code for causing the computer to access a current input block of the audio output stream corresponding to the current analysis time;

program code for causing the computer to set an input phase vocoder input hop size equal the difference between the current analysis time and an immediately previous analysis time;

program code for causing the computer to perform an FFT on the current block of the audio input stream to generate a set of frequency bins;

program code for causing the computer to perform an inverse FFT on said frequency bins to generate a current output block of the audio output stream;

program code for causing the computer to overlap the current output block with a previous output block separated by a fixed output hop size.

* * * * *